US008362125B2

(12) United States Patent
Gong et al.

(10) Patent No.: US 8,362,125 B2
(45) Date of Patent: Jan. 29, 2013

(54) HOT MELT ADHESIVE

(75) Inventors: Lie-Zhong Gong, Bridgewater, NJ (US); Dale L. Haner, Ringwood, NJ (US); Charles W. Paul, Madison, NJ (US); Qiwei He, Belle Mead, NJ (US); Abhi Narthana, Belle Mead, NJ (US)

(73) Assignee: Henkel AG & Co. KGAA, Duesseldorf (DE)

( * ) Notice: Subject to any disclaimer, the term of this patent is extended or adjusted under 35 U.S.C. 154(b) by 407 days.

(21) Appl. No.: 11/732,242

(22) Filed: Apr. 3, 2007

(65) Prior Publication Data

US 2008/0249216 A1 Oct. 9, 2008

(51) Int. Cl.
*C09D 11/10* (2006.01)

(52) U.S. Cl. ........ 524/272; 524/277; 524/274; 524/275; 156/334

(58) Field of Classification Search ................... 524/277
See application file for complete search history.

(56) References Cited

U.S. PATENT DOCUMENTS

| | | | | |
|---|---|---|---|---|
| 3,743,626 | A | 7/1973 | Emmons | |
| 4,039,733 | A * | 8/1977 | Kudo et al. | 526/185 |
| 4,381,388 | A | 4/1983 | Naples | |
| 4,460,728 | A * | 7/1984 | Schmidt et al. | 524/271 |
| 4,471,102 | A | 9/1984 | Petschke | |
| 4,618,640 | A * | 10/1986 | Tsuchida et al. | 524/272 |
| 4,792,495 | A | 12/1988 | Taniguchi et al. | |
| 4,879,365 | A | 11/1989 | Petschke et al. | |
| 5,441,999 | A * | 8/1995 | Jarvis et al. | 524/271 |
| 5,874,497 | A * | 2/1999 | Schellenbeck et al. | 524/504 |
| 6,593,407 | B2 * | 7/2003 | Haner et al. | 524/272 |
| 6,890,982 | B2 | 5/2005 | Borsinger et al. | |
| 7,019,060 | B1 | 3/2006 | Morrison et al. | |
| 2003/0091760 | A1 * | 5/2003 | Drogou et al. | 428/34.2 |
| 2003/0105183 | A1 | 6/2003 | Sharak | |
| 2003/0229168 | A1 | 12/2003 | Borsinger et al. | |
| 2004/0225046 | A1 | 11/2004 | Quinn | |
| 2005/0075431 | A1 | 4/2005 | Haner et al. | |
| 2007/0249771 | A1 | 10/2007 | Paul et al. | |
| 2008/0076860 | A1 | 3/2008 | Ahmed et al. | |
| 2008/0249216 | A1 | 10/2008 | Gong et al. | |
| 2008/0249233 | A1 | 10/2008 | Haner et al. | |

FOREIGN PATENT DOCUMENTS

| | | | |
|---|---|---|---|
| EP | 0965627 | A1 | 12/1999 |
| EP | 1099742 | A1 | 5/2001 |
| GB | 1119379 | | 7/1968 |
| JP | 2004155925 | | 6/2004 |
| JP | 2005036067 | | 2/2005 |
| WO | 9213907 | A1 | 8/1992 |
| WO | 2008008420 | | 1/2008 |

OTHER PUBLICATIONS

Meda et al, Derwent abstract of EP 965627, Dec. 1999.*

* cited by examiner

*Primary Examiner* — Doris Lee
(74) *Attorney, Agent, or Firm* — Sun Hee Lehmann

(57) ABSTRACT

Hot melt packaging adhesives comprising a base polymer component, a tackifier component and a wax component, which wax component comprises a soy wax, and are described.

10 Claims, 3 Drawing Sheets

Figure 1:
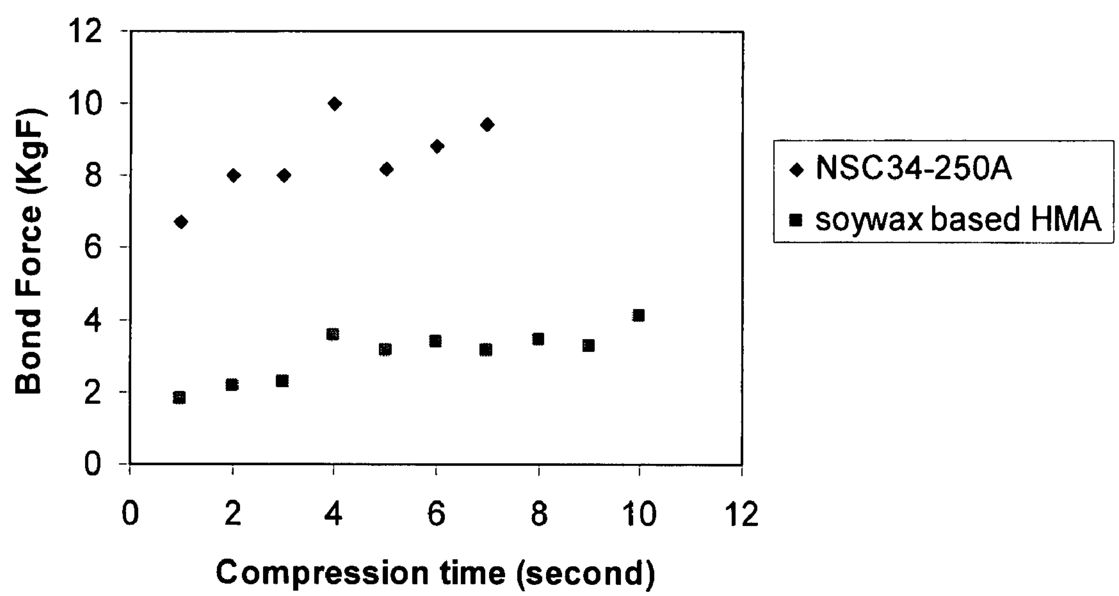

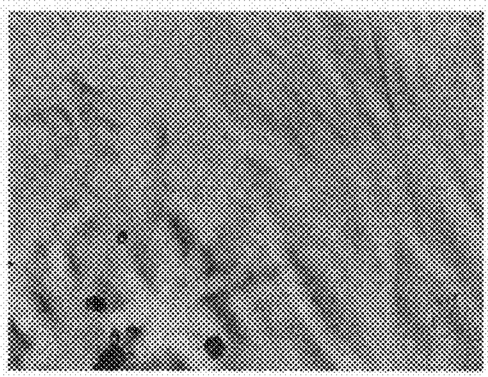
63C
62.75C
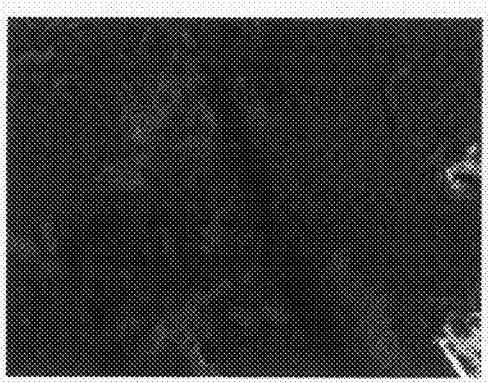
62.50C
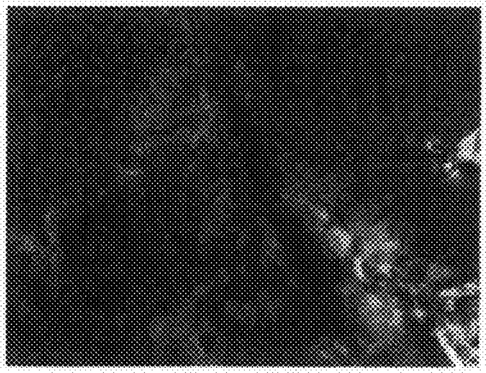
62.25C
Figures 2A-D

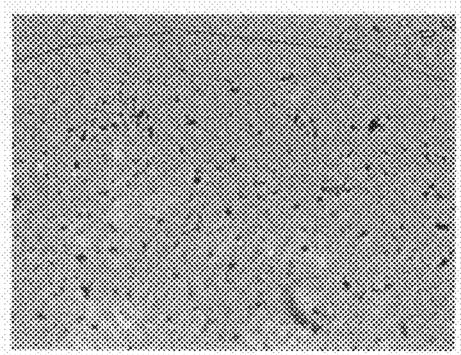
51.50C
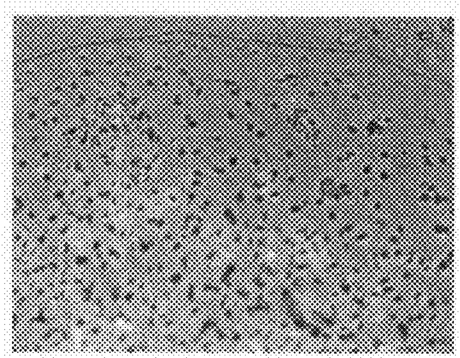
51.25C
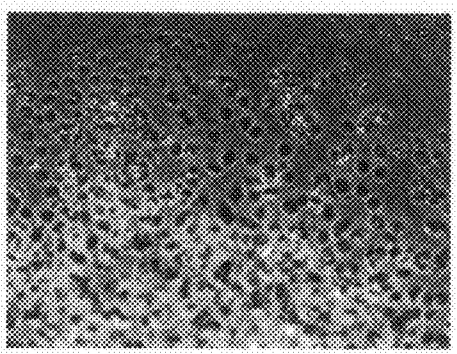
51.00C
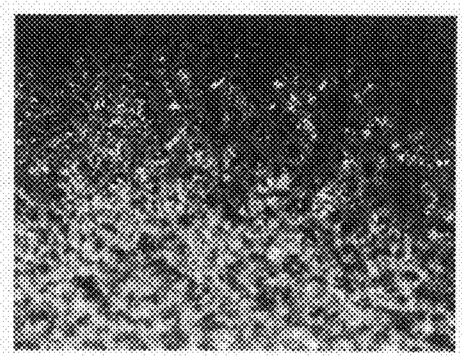
50.75C
Figures 3A-D

HOT MELT ADHESIVE

FIELD OF THE INVENTION

The invention relates to hot melt adhesives that comprise a vegetable derived wax such as soy wax. More particularly the invention relates to hot melt adhesives that have good set speed characteristics and heat resistance, making these adhesives particularly well suited for packaging applications.

BACKGROUND OF THE INVENTION

Hot melt adhesives are applied to a substrate when molten, and then placed in contact with a second substrate. The adhesive cools and hardens to form a bond between the substrates. Hot melts are widely used for industrial adhesive applications such as product assembly and packaging. The latter include case and carton sealing.

Hot melts for packaging applications such as case and carton sealing are typically composed of a polymer, a diluent or tackifier, and a wax. The wax serves several functions. Because it is low in molecular weight, it reduces viscosity. Low viscosity helps to lower application temperatures, provide cleaner processing, and also good wet out of the substrates. In addition, the wax crystallizes quickly which helps the material to harden or set quickly. Fast set speed is important for high speed production. Lastly, the wax provides temperature resistance to the final bond due to its elevated melting point.

Current used packaging adhesives comprise petroleum-derived waxes such as paraffin and microcrystalline wax. The lower molecular weight of paraffin wax, makes it the primary choice when formulating low application temperature adhesives.

Recently, due to the limited supply of paraffin wax, attention has turned to the use of natural waxes. Of the natural waxes, the lowest cost materials are based on highly hydrogenated triglycerides (Borsinger et al., U.S. Pat. No. 6,890,982 B2). The high levels of hydrogenation (low iodine values) are necessary to elevate the melting point closer to paraffin. Unfortunately, with these materials it is difficult to achieve adhesives with sufficiently high melting points and adequate set speeds.

A need continues to exist for a substitute for paraffin wax, and for hot melt adhesive formulations that do not sacrifice set speed or heat resistance. The invention fulfills this need.

SUMMARY OF THE INVENTION

The invention provides a hot melt adhesive comprising a vegetable derived wax, which adhesive has a set speed of 5 seconds or less and a heat resistance of 130° F. or greater. In particularly preferred embodiments the adhesive will comprise at least one ethylene copolymer, a mixture of a soy wax and a synthetic or paraffin wax, and a tackifier. The adhesive may advantageously be formulated for low temperature application. The adhesives of the invention are particularly useful in packaging applications, in particular case and carton sealing applications.

One embodiment is directed to a hot melt adhesive that comprises 25 to 40 wt % of ethylene vinyl acetate having 18-33 wt % of vinyl acetate and a melt index of 3-800 dg/min and/or ethylene n-butyl acrylate having 28-35% of n-butyl acrylate, and melt index of 60-900 dg/min, 10-25 wt % of soy wax with melting point from 130° F. to 190° F., 10-25 wt % of a synthetic wax with melting point from 140° F. to 250° F., and 20-40 wt % of a tackifier selected from the group consisting (i) C5 modified C9 with at least 25% of aromatic carbons and with a softening point from 90° C. to 150° C., (ii) a terpene phenolic rosin with a softening point from 120° C. to 150° C., (iii) a rosin ester with softening point from 100° C. to 140° C. and (iv) mixtures thereof.

Another embodiment the adhesive is directed to a hot melt adhesive that comprises 25 to 40 wt % of ethylene vinyl acetate having 18-33 wt % of vinyl acetate and a melt index of 400-3000 dg/min and/or ethylene n-butyl acrylate having 28-35% of n-butyl acrylate, and melt index of 300-1000 dg/min, 10-25 wt % of soy wax with melting point from 130° F. to 190° F., 10-25 wt % of a synthetic wax and/or paraffin wax with melting point from 140° F. to 200° F., and 20-40 wt % of a tackifier selected from the group consisting of (i) a rosin or rosin ester with softening point from 110° C. to 150° C., a terpene phenolic rosin with a softening point from 125° C. to 150° C., (iii) a rosin phenolic rosin with a softening point from 125° C. to 150° C. and (iv) mixtures thereof.

Yet another embodiment of the invention provides articles manufactured using the hot melt adhesive of the invention.

Still another aspect of the invention is directed to a method of sealing and/or making or forming a case, a carton, a tray, a box or a bag or other packaging article. These methods comprise using a soy wax-containing hot melt adhesive having a set speed of 5 seconds or less and a heat resistance of 130° F. or greater. Also provided are articles manufactured using the soy wax-containing adhesives of the invention. Encompassed are cartons, cases, trays, bags and the like that can be used for packaging products. Such articles typically comprise cardboard or paperboard which has been adhered by such hot melt adhesives. The invention also provides packaged articles contained within a carton, case, tray or bag, in particular packaged food, wherein the carton, case, tray or bag comprises a soy wax-containing adhesive.

The invention also provides a process for bonding a substrate to a similar or dissimilar substrate comprising applying to at least one substrate a molten soy wax containing hot melt adhesive composition and thereafter bonding said substrates together.

BRIEF DESCRIPTION OF THE DRAWING FIGURES

FIG. 1 shows the relationship between the bond force and the compression time for a commercially available 250° F. applied hot melt adhesive based on paraffin/synthetic wax and a soy wax-based hot melt adhesive.

FIGS. 2A-D are polarized light optical microscope pictures of paraffin/synthetic wax at various temperatures. The pictures indicated that the synthetic/paraffin crystallized very fast and formed large crystal size on cooling.

FIGS. 3A-D are polarized light optical microscope pictures of soy waxes at various temperatures. The pictures indicated the soy waxes crystallized very slow and formed small crystal size on cooling.

DETAILED DESCRIPTION OF THE INVENTION

All references cited herein are incorporated in their entireties by reference.

A vegetable derived wax is defined herein as a wax derived from renewable natural resource, such as from a plant source such as soybean, cottonseed, corn, sunflower, canola and palm. More particularly a hydrogenated oil comprising a triglyceride whose fatty acid components have a range of carbon numbers, with stearic acid ($C_{18}$) being the most predominate. The term "soy wax" is used herein to refer to a wax derived from soybeans.

Hot melt adhesives are widely used in the packaging industry to seal cardboard cases, trays, and cartons. Set speed and heat resistance are two important characteristics of hot melt adhesives for packaging applications.

Set speed is defined as the time needed for the hot melt adhesive to solidify to the point where it possesses enough strength to form bonds. Good set speed is critical for adhesives such that sealed boxes and trays will not pop open right after their exiting the compression section on the packaging line. On modern high speed packaging lines, a set speed of 5 seconds or shorter is necessary.

Heat resistance (or heat stress) measures the temperature at which the adhesive starts to fail. Hot melt adhesives generally need heat resistance of 54° C. (~130° F.) or above such that sealed cases, cartons or trays will not have heat related failure in Summer time during transportation or warehouse storage.

Currently available hot melt adhesives are composed of polymers, tackifiers and waxes. Among these ingredients, the wax is very critical because it reduces the adhesive viscosity and more importantly helps control the set speed of the adhesive through the crystallization mechanism. The most popularly used waxes are paraffin waxes, microcrystalline waxes, Fischer-Tropsch synthetic waxes, and polyethylene waxes, all of which are a blend of linear and branched hydrocarbons. Paraffin wax, for example, is a mixture of the following linear, branched and cyclic hydrocarbons:

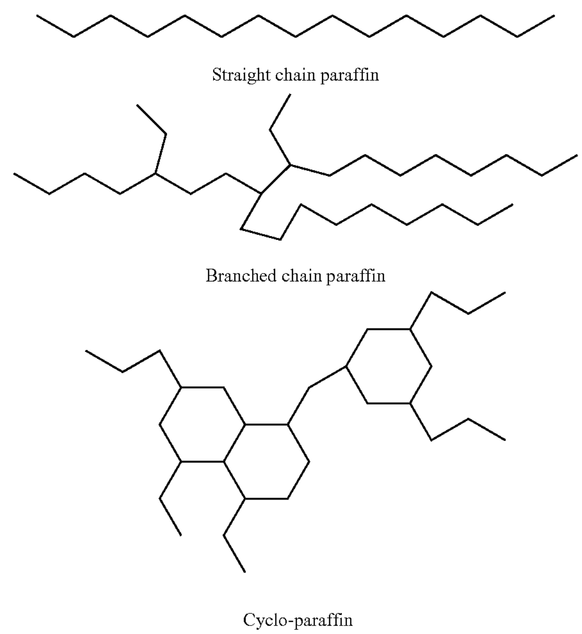

Adhesives of the invention comprise an adhesive base polymer component, a tackifier component and a wax component. In contrast to waxes currently used to formulate hot melt adhesives, the adhesives of the invention are formulated using a vegetable derived wax. Examples include waxes derived from soybean, corn, cottonseed, rape, canola, sunflower, palm, coconut, crambe, linseed and peanut wax. One embodiment uses a soybean derived wax. Soy waxes are derived from fully hydrogenated soy oil and are essentially triglycerides, which may be illustrated as:

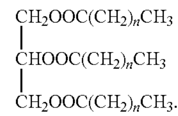

There is a great deal of interest in formulating hot melt adhesives from vegetable derived waxes such as soy waxes recently due to its renewable nature and ready availability. While U.S. Pat. No. 6,890,982 B2 discloses that hot melt adhesives may be prepared using soy wax, ethylene vinyl acetate and rosin ester tackifier with acid number from about 3 to about 10, satisfactory set time and heat resistance for use in packaging applications could not be obtained.

It has now been discovered that hot melt adhesives, both conventionally applied (applied at temperatures above 300° F.) and low temperature applied (applied at temperature between 200 and 300° F.), suitable for use as a hot melt packaging adhesive can be formulated using soy waxes. Advantages of using a low application temperature hot melt adhesive includes reduced number and/or capacity of heating elements required in the hot melt adhesive tanks, reduced volatile emissions, reduced risk of burn injury, and reduced wear and tear on the application equipment. While there are currently several low application temperature hot melt adhesives are available commercially, such as for example NSC 34-2125 (National Starch and Chemical Company), NSC 34-250A (National Starch and Chemical Company), NSC 34-650A (National Starch and Chemical Company), HL 7000 (H. B. Fuller), and HL 7002 (H. B. Fuller), none of these low application temperature hot melt adhesives are based on soy wax.

It has been discovered that soy wax based hot melt adhesives with both good heat stress and set speed may be formulated by carefully selecting tackifiers to ensure that the soy wax and the synthetic/paraffin wax interacted well. It has been further discovered that the tackifiers selected for use must further be selected based on the application temperature at which the adhesive is to be used.

Polymers for use in formulating hot melt adhesives of the invention are ethylene and propylene homo- and co-polymers and mixtures thereof. Preferred for use are ethylene copolymers. Examples are ethylene copolymers with vinyl acetate, n-butyl acrylate, n-hexyl acrylate, butene, octene, acrylic acid, and methacrylic acid. Also useful are amorphous polyalpha olefins such as atactic propylene, and propylene copolymers with ethylene, butene, hexene, and octene.

The adhesives of the invention will preferably comprise at least one ethylene polymer, and may comprise a blend of two or more polymers. The term ethylene polymer, as used herein, refers to homopolymers, copolymers and terpolymers of ethylene. Preferred are copolymers of ethylene with one or more polar monomers, such as vinyl acetate or other vinyl esters of monocarboxylic acids, or acrylic or methacrylic acid or their esters with methanol, ethanol or other alcohols. Included are ethylene vinyl acetate, ethylene methyl acrylate, ethylene n-butyl acrylate, ethylene acrylic acid, ethylene methacrylate, ethylene 2-ethylhexylacrylate, ethylene octane, ethylene butene and mixtures and blends thereof. Ethylene n-butyl acrylate and ethylene vinyl acetate, as well as mixtures thereof, are particularly preferred.

The adhesive compositions of this invention are tackified. The tackifier component will usually be present in an amount of from about 10 wt % to about 60 wt %, more preferably from about 20 wt % to about 50 wt %, even more preferably from about 20 wt % to about 40 wt %. These include natural and synthetic resins. Natural resins include rosin, rosin esters, and polyterpenes. Synthetic resins include C5 cyclic and acyclic resins, aromatic resins, C9 resins, pure monomer resins such as those based on alpha-methyl styrene, and copolymer resins of the above monomers with each other and/or phenol.

In addition to a vegetable derived wax, the formulations of the invention also comprise a petroleum based or synthetic wax. Waxes suitable for use in the present invention include paraffin waxes, microcrystalline waxes, polyethylene waxes, polypropylene waxes, by-product polyethylene waxes, Fischer-Tropsch waxes, oxidized Fischer-Tropsch waxes and functionalized waxes such as hydroxy stearamide waxes and fatty amide waxes. It is common in the art to use the terminology synthetic high melting point waxes to include high density low molecular weight polyethylene waxes, by-product polyethylene waxes and Fischer-Tropsch waxes. Modified waxes, such as vinyl acetate modified, maleic anhydride modified, and oxidized waxes may also be used.

Paraffin waxes that can be used in the practice of the invention include Okerin® 236 TP available from Astor Wax Corporation, Doraville, Ga.; Penreco® 4913 available from Pennzoil Products Co., Houston, Tex.; R-7152 Paraffin Wax available from Moore & Munger, Shelton, Conn.; and Paraffin Wax 1297 available from International Waxes, Ltd. in Ontario, Canada, Pacemaker available from Citgo, and R-2540 available from Moore and Munger; and other paraffinic waxes such as those available from CP Hall under the product designations 1230, 1236, 1240, 1245, 1246, 1255, 1260, & 1262. CP Hall 1246 paraffinic wax is available from CP Hall (Stow, Ohio).

Soy waxes are commercially available form Cargill, ADM and Bunge Oils.

Other compounds could be added that also do not affect physical properties are pigments which add color, or fluorescing agents, to mention only a couple. Additives like these are known to those skilled in the art. Depending on the contemplated end uses of the adhesives, other additives such as plasticizers, pigments and dyestuffs conventionally added to hot melt adhesives might be included. In addition, small amounts of additional tackifiers and/or waxes such as microcrystalline waxes, hydrogenated castor oil and vinyl acetate modified synthetic waxes may also be incorporated in minor amounts, i.e., up to about 10 percent by weight, into the formulations of the present invention.

The adhesives of the present invention will preferably contain a stabilizer or antioxidant. These compounds are added to protect the adhesive from degradation caused by reaction with oxygen induced by such things as heat, light, or residual catalyst from the raw materials such as the tackifying resin. Among the applicable stabilizers or antioxidants included herein are high molecular weight hindered phenols and multifunctional phenols such as sulfur and phosphorous-containing phenol.

It has been discovered that both excellent set speed and heat stress may be obtained using adhesives formulated for application at temperatures above 300° F., such as 350° F. applied hot melt adhesives, when the adhesive comprises 1) 25-40 wt % of EVA (18-33 wt % VA, 3-800 MI) and/or EnBA (28-35% nBA, 60-900 MI), 2) 10-25 wt % of soy wax with melting point from 130° F. to 190° F., 3) synthetic wax 10-25 wt % with melting point from 140° F. to 250° F., and 4) 20-40 wt % of C5 modified C9 with at least 25% of aromatic carbons and with softening point from 95 to 150° C., or 20-40 wt % of terpene phenolic with softening point from 120° C. to 150° C., or rosin ester with softening point from 100° C. to 140° C. Mixtures of one or more of these tackifiers may also be used.

When rosin ester was used, it was found that the acid number of rosin ester was not critical to the performance of hot melt adhesives. The most critical property was determined to be the softening point (SP) of the rosin ester. It was found that while a low SP rosin ester would compromise the heat stress of the hot melt adhesive, a rosin ester with too high SP would result in hot melt adhesives with poor adhesion and high viscosity.

It has also been discovered that both excellent set speed and heat stress may be obtained using low application temperature hot melt adhesives, i.e., adhesives formulated for application at temperatures below 300° F., such as 250° F. applied hot melt adhesives, when the adhesive comprises 1) 25-40 wt % of EVA (18-33 wt % VA, 400-3000 MI) and/or EnBA (28-35% nBA, 300-1000 MI), 2) 10-25 wt % of soy wax with melting point from 130° F. to 190° F., 3) 10-25 wt % of synthetic wax/paraffin with melting point from 140° F. to 200° F., and 4) 20-40 wt % of rosin or rosin ester with softening point from 110° C. to 150° C., or terpene phenolic with softening point from 125° C. to 150° C., or rosin phenolic with softening point from 125° C. to 150° C. Mixtures of one or more of these tackifiers may also be used. It was again determined that when using a rosin ester, the acid number of rosin ester was not critical to the performance of the formulated hot melt adhesives.

EXAMPLES

All adhesive formulations disclosed in these examples were prepared in a single blade mixer heated to 325° F. by mixing the components until homogeneous. The adhesives were then subjected to various tests simulating real packaging applications.

Melt viscosities of hot melt adhesives were determined on a Brookfield Thermosel viscometer using a No. 27 spindle at 250° F. or 275° F. for low application temperature hot melt adhesives and at 350° F. for 350° F. applied hot melt adhesives.

The heat resistance test of adhesives was following a procedure similar to the IoPP heat stress test standard. The adhesive bonds construction was identical to what was described in the IoPP test. Adhesive bonds with the glue line dimension of 2"×0.5" after compression were subjected to a 450 g cantilever force and were placed in an oven. The oven temperature was ramped from 100° F. to 180° F. linearly in 8 hrs. The temperature at which the adhesive bonds failed was recorded as the heat stress of the adhesive. The heat stress results reported were the average of five bonds tested.

The set speed of the adhesives was determined as the following. Hot melt adhesives were applied at 250° F. or 275° F. for low application temperature adhesives or at 350° F. for conventional hot melt adhesives on a single fluted corrugated paperboard of 4" long and 2" wide at a coating weight of 1.4 g/m. The glue was left open for 1 second and then was bonded to another single fluted corrugated paperboard of 2" long and 2" wide. The bond was compressed with 1 kg force for various periods of time and then pulled apart in a tensile force mode. The resulting peak bond force was recorded. The set speed was defined as the shortest compression time required for the bond to gain 5 Kg bond force.

Comparative Example 1

Cool Lok 34-250A, a commercial grade 250° F. applied hot melt adhesive based on paraffin/synthetic wax commercially available from National Starch and Chemical Company, was compared to a soy wax based hot melt adhesive having the formulation set forth in Table 4 of U.S. Pat. No. 6,890,982 B2. FIG. 1 shows the relationship between the bond force and the compression time for these two adhesives. The soy wax based adhesive took more than 10 seconds to set and had very poor set speed characteristics. This set speed is too slow and does not meet the needs for modern packaging applications, which typically have 5 seconds or shorter compression time.

Comparative Example 2

To increase the set speed of soy wax based hot melt adhesives, synthetic waxes and soy wax were blended together. The composition of hot melt adhesives samples 1 and 2 and their set speed and heat stress characteristics are shown in Table 1.

Sample 1, which was solely based on soy wax, was the same as the formulation set forth in Table 4 of U.S. Pat. No. 6,890,982 B2.

Sample 2 was formulated with a blend of soy wax and synthetic wax.

Compared with sample 1, the set speed of sample 2 increased dramatically with the addition of the synthetic wax. However, the addition of the synthetic wax in the soy wax based formula significantly reduced the heat stress of the hot melt adhesives. Sample 1 did not have the necessary set speed characteristics and therefore was not suitable for packaging applications. While Sample 2 showed increased set speed, it had poor heat resistance and, therefore, was not useful for packaging applications.

TABLE 1

| Supplier | | Sample 1 | Sample 2 |
|---|---|---|---|
| Cargill | Stable Flake S soy wax | 66 | 33 |
| CIBA | Antioxidant | 2 | 2 |
| Equistar | Ultrathene UE 646-04 (EVA 28VA/25MI) | 66 | 66 |
| Sasol | H4 (F-T wax, 202° F. mp) | | 33 |
| Hercules Corp. | Foral 85 (rosin ester) | 66 | 66 |
| Shell Oil | Calista 158 (F-T wax, 158° F. mp) | | |
| | Total | 200 | 200 |
| | application temp | 350° F. | 350° F. |
| | Viscosity at 350° F. (cps) | 2460 | 2390 |
| | Set speed (Second) | >10 | 2 |
| | Heat stress (° F.) | 135.4 | 115.5 |

Comparative Example 3

Efforts were made to formulate low application temperature soy wax based hot melt adhesives. The composition of hot melt adhesives samples 3 and 4 and their set speed and heat stress characteristics are shown in Table 2.

Sample 3, which was based solely based on soy wax, possessed good heat stress but did not show acceptable set speed.

Sample 4, which was formulated using a blend of soy wax and synthetic wax, showed an improved set speed, but had poor heat resistance and thus was not useful for packaging applications.

TABLE 2

| Supplier | | Sample 3 | Sample 4 |
|---|---|---|---|
| Cargill | Stable Flake S soy wax | 66 | 33 |
| CIBA | Antioxidant | 2 | 2 |
| ExxonMobil | UL 8705 (EVA 28VA/800MI) | 66 | 66 |
| Hercules Corp. | Foral 85 (rosin ester) | 66 | 66 |
| Shell Oil | Calista 158 (F-T wax, 158° F. mp) | | 33 |
| | Total | 200 | 200 |
| | application temp | 250° F. | 250° F. |
| | viscosity at 250° F. | 1210 | 985 |
| | Set speed (Second) | 7 to 8 | 2 |
| | Heat stress (° F.) | 133 | 104 |

Following detailed investigation, it was discovered that soy wax crystallized differently than synthetic wax or paraffin wax.

FIGS. 2A-D are polarized light optical microscope pictures of paraffin/synthetic wax at various temperatures. These pictures indicated that the synthetic/paraffin waxes crystallized very fast and formed large crystal size on cooling.

FIGS. 3A-D are polarized light optical microscope pictures of soy waxes at various temperatures. The pictures indicated the soy waxes crystallized very slow and formed small crystal size on cooling.

As illustrated in FIGS. 2A-D and 3A-D, soy wax crystallized very slowly following clear nucleating and growing processes and formed small size of crystals, while synthetic and paraffin wax crystallized very quickly and formed large size of crystals. These different crystallization paths may explain why a simple blend of soy wax and paraffin/synthetic waxes in the adhesive would compromise the heat stress of the adhesive.

Example 4

350° F. applied adhesive samples 5-10 having the formulations shown in Tables 3A and 3B were prepared and set speed and heat stress performance evaluated. Both excellent set speed and heat stress were obtained using the 350° F. applied hot melt adhesives shown in Tables 3A and 3B.

TABLE 3A

| Suppliers | Ingredient | Sample 5 | Sample 6 | Sample 7 |
|---|---|---|---|---|
| Cargill | Stable Flake S 155 Soy wax, SP = 155° F. | 18 | 18 | 18 |
| Du Pont | ELVAX 260 (EVA 28VA/6MI) | 10 | 10 | 10 |
| Ciba | Anti oxidant | 0.5 | 0.5 | 0.5 |
| ExxonMobil | ESCOREZ 5615 (Hydrogenated C9, 118° C. SP) | 32 | | |
| Kolon | Hikotack P-120 (120° C. SP, C5 modified C9) | | 32 | |
| Du Pont | ELVAX 210W (EVA 28VA/420MI) | | 5 | 25 |
| Rutgers | NOVARES TK110 H | | | 32 |
| Sasol | H4 (F-T wax, 202° F. mp) | 15 | 15 | 15 |

TABLE 3A-continued

| Suppliers | Ingredient | Sample 5 | Sample 6 | Sample 7 |
|---|---|---|---|---|
| ExxonMobil | ENABLE EN 33330 (EnBA 35BA/320MI) | 25 | 20 | |
| | Total | 100.5 | 100.5 | 100.5 |
| | application temp | 350° F. | 350° F. | 350° F. |
| | viscosity at 350° F. (Cps) | 1535 | 1550 | 1210 |
| | Set Speed (seconds) | 1–1.5 | 1.5 | 1–1.5 |
| | Heat Stress (° F.) | 137 | 136 | 135 |

TABLE 3B

| Suppliers | Ingredient | Sample 8 | Sample 9 | Sample 10 |
|---|---|---|---|---|
| Cargill | Stable Flake S 155 Soy wax, SP = 155° F. | 15 | 18 | 18 |
| Du Pont | ELVAX 260 (EVA 28VA/6MI) | 12 | 10 | 10 |
| Ciba | Antioxidant | 0.5 | 0.5 | 0.5 |
| Eastman Chemical | Pentalyn C resin (Rosin Ester, 120° C. SP) | | | 32 |
| Arizona Chemical | Sylvalite RE100L, rosin ester, SP = 100° C. | | 32 | |
| Du Pont | ELVAX 210W (EVA 28VA/420MI) | 25 | 25 | 25 |
| Arizona Chemical | SYLVARES TP 2040 HM, terpene phenolic, SP = 125° C. | 33 | | |
| Sasol | H4 (F-T wax, 202° F. mp) | 15 | 15 | 15 |
| | Total | 100.5 | 100.5 | 100.5 |
| | application temp | 350° F. | 350° F. | 350° F. |
| | viscosity at 350° F. (Cps) | 2220 | 1250 | 1450 |
| | Set Speed (seconds) | 2–2.5 | 2.5 | 2 |
| | Heat Stress (° F.) | 133 | 130 | 137 |

Example 5

Low application temperature hot melt adhesives samples 11-17 having the formulations shown in Tables 4A and 4B were prepared and set speed and heat stress performance evaluated. Both excellent set speed and heat stress were obtained using the low application temperature hot melt adhesives shown in Tables 4A and 4B.

TABLE 4A

| Supplier | Ingredient | Sample 11 | Sample 12 | Sample 13 |
|---|---|---|---|---|
| Cargill | Stable Flake S 155 Soy wax | 16 | 16 | 16 |
| ExxonMobil | ENABLE EN 33900 (EnBA 33BA/900MI) | 20 | 20 | 20 |
| ExxonMobil | ESCORENEAD2528 (EVA 28VA/2500MI) | 15 | 15 | 15 |
| EQUISTAR CHEMICALS | ULTRATHENE UE 665-67 (EVA 28VA/800MI) | | | |
| Eastman Chemical | Dymerex 140 (135° C. SP, Polymerized rosin) | | | 33 |
| Eastman Chemical | Pentalyn C resin (Rosin Ester, 125° C. SP) | 33 | 33 | |
| Kolon | Hikotack P-120 (120° C. SP, C5 modified C9) | | | |
| Sasol | PARAFLINT C-80 | 16 | | 16 |
| Shell Oil | Calista 158 wax | | 16 | |
| | Total | 100 | 100 | 100 |
| | application temp | 250° F. | 250° F. | 250° F. |
| | Viscosity@ 250° F. | 1220 | 1130 | 1375 |
| | Set Speed (Seconds) | 1.5–2 | 2 | 1.5–2 |
| | Heat Stress (° F.) | 137 | 135 | 137 |

TABLE 4B

| Supplier | Ingredient | Sample 14 | Sample 15 | Sample 16 | Sample 17 |
|---|---|---|---|---|---|
| Cargill | Stable Flake S 155 Soy wax | 16 | 16 | 15 | 15 |
| ExxonMobil | ENABLE EN 33900 (EnBA 33BA/900MI) | 20 | | 20 | 20 |
| ExxonMobil | ESCORENEAD2528 (EVA 28VA/2500MI) | 15 | | 15 | 15 |
| EQUISTAR CHEMICALS | ULTRATHENE UE 665-67 (EVA 28VA/800MI) | | 35 | | |
| Eastman Chemical | Pentalyn C resin (Rosin Ester, 120° C. SP) | 17 | 33 | | |
| Arizona Chemical | XR-7502, rosin phenolic, SP = 135° C. | | | | 35 |
| Kolon | Hikotack P-120 (120° C. SP, C5 modified C9) | 16 | | | |
| Arizona Chemical | SYLVARES TP 7042, terpene phenolic, SP = 150° C. | | | 35 | |
| Sasol | H4 (F-T wax, 202° F. mp) | | | 15 | 15 |
| Shell Oil | Calista 158 wax | 16 | 16 | | |
| | Total | 100 | 100 | 100 | 100 |
| | application temp | 250° F. | 250° F. | 275° F. | 275° F. |
| | viscosity at application temperature (CPS) | 1105 | 1650 | 1320 | 1115 |
| | Set Speed (Seconds) | 2 | 2 | 1.5 | 1.5-2 |
| | Heat Stress (° F.) | 136 | 135 | 136 | 134 |

The invention claimed is:

1. A hot melt adhesive comprising:

an ethylene vinyl acetate having 18-33 wt % of vinyl acetate and a melt index of 3 -800 dg/min and/or ethylene n-butyl acrylate having 28-35% of n-butyl acrylate, and a melt index of 60-900 dg/min, 10 to 25 wt % of a soy wax with a melting point from 130° F. to 190° F., 15 to 25 wt % of a synthetic wax with a melting point from 140° F. to 250° F., and a tackifier selected from the group consisting (i) C5 modified C9 with at least 25% of aromatic carbons and with a softening point from 90° C. to 150° C., (ii) a terpene phenolic rosin with a softening point from 120° C. to 150° C., (iii) a rosin ester with a softening point from 100° C. to 140° C. and (iv) mixtures thereof; and wherein the adhesive has a set speed of 5 seconds or less and a heat resistance of 130° F. or greater.

2. The adhesive of claim 1 which is applied to a substrate at a temperature of between 200° F. and 300° F.

3. The hot melt adhesive of claim 1 comprising 5 to 40 wt % of said ethylene vinyl acetate and/or ethylene n-butyl acrylate and 20-40 wt % of said tackifier.

4. An article of manufacture comprising the adhesive of claim 1.

5. The article of claim 4 which is a packaging article.

6. A hot melt adhesive comprising an ethylene vinyl acetate having 18-33 wt % of vinyl acetate and a melt index of 400-3000 dg/min and/or ethylene n-butyl acrylate having 28-35% of n-butyl acrylate, and a melt index of 300-1000 dg/min, 10-25 wt % of a soy wax with melting point from 130° F. to 190° F., 15-25 wt % of synthetic wax and/or paraffin wax with a melting point from 140° F. to 200° F., and a tackifier selected from the group consisting of (i) a rosin or rosin ester with a softening point from 110° C. to 150° C., a terpene phenolic rosin with a softening point from 125° C. to 150° C., (iii) a rosin phenolic rosin with a softening point from 125° C. to 150° C. and (iv) mixtures thereof; and wherein the adhesive has a set speed of 5 seconds or less and a heat resistance of 130° F. or greater.

7. The hot melt adhesive of claim 6 comprising 25 to 40 wt % of said ethylene vinyl acetate and/or ethylene n-butyl acrylate and 20-40 wt % of said tackifier.

8. The adhesive of claim 6 which is applied to a substrate at a temperature of between 200° F. and 300° F.

9. An article of manufacture comprising the adhesive of claim 6.

10. The article of claim 9 which is a packaging article.

* * * * *